United States Patent [19]

Billet

[11] Patent Number: 4,689,954
[45] Date of Patent: Sep. 1, 1987

[54] TRANSMISSION SYSTEM, IN PARTICULAR FOR AUTOMOBILE VEHICLES, HYDRAULIC COUPLING UNIT COMPRISING SAME, MOVEMENT TAKE-UP DEVICE ADAPTED FOR USE IN SAME, AND METHOD OF MANUFACTURING SAID MOVEMENT TAKE-UP DEVICE

[75] Inventor: Ren Billet, Lamorlaye, France
[73] Assignee: Valeo, Paris, France
[21] Appl. No.: 795,886
[22] Filed: Nov. 7, 1985
[30] Foreign Application Priority Data
  Nov. 9, 1984 [FR] France .................. 84 17126
[51] Int. Cl.$^4$ ............................................. F16D 33/00
[52] U.S. Cl. .................................. 60/338; 192/70.18; 192/106.2; 464/68
[58] Field of Search ............... 60/338, 344, 345, 346; 192/70.17, 70.18, 106.1, 106.2; 464/67, 68

[56] References Cited

U.S. PATENT DOCUMENTS 4,588,058 5/1986 Aliouate ................... 464/68

Primary Examiner—Stephen F. Husar
Attorney, Agent, or Firm—Charles E. Brown; Charles A. Brown

[57] ABSTRACT

A transmission system comprises an annular input member adapted to be keyed at least circumferentially to a first shaft. It has a generally cylindrical axial wall. A movement take-up device within this cylindrical wall has at least one protected mild steel lug by which it is keyed axially and circumferentially to the cylindrical wall and by which it is adapted to be at least circumferentially keyed to a second shaft. The movement take-up device also comprises an input part to which one end of this lug is welded, the other end of the lug being fixed to the cylindrical wall.

17 Claims, 6 Drawing Figures

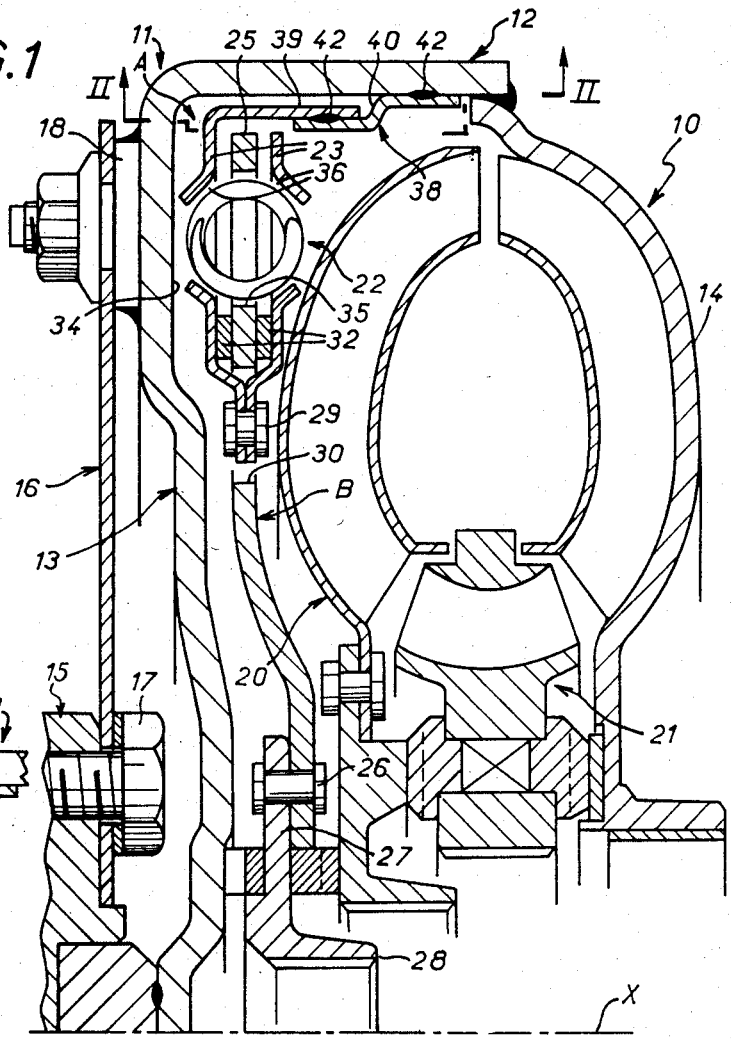
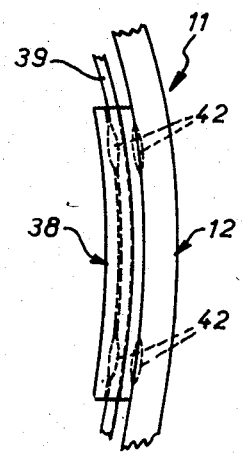
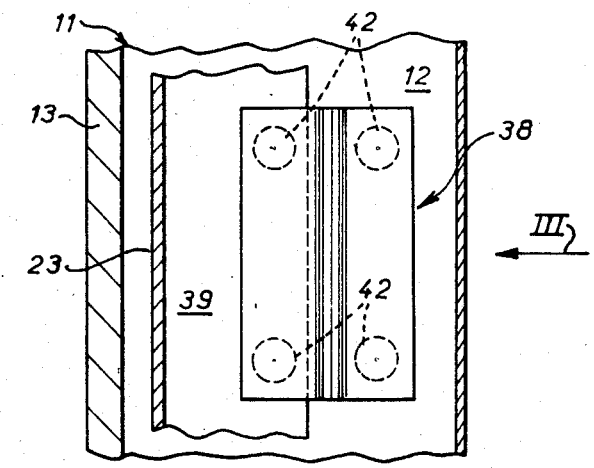

TRANSMISSION SYSTEM, IN PARTICULAR FOR AUTOMOBILE VEHICLES, HYDRAULIC COUPLING UNIT COMPRISING SAME, MOVEMENT TAKE-UP DEVICE ADAPTED FOR USE IN SAME, AND METHOD OF MANUFACTURING SAID MOVEMENT TAKE-UP DEVICE

BACKGROUND OF THE INVENTION

1. Field of the invention

The present invention generally concerns transmission systems designed to contribute to the rotational coupling of one shaft to another.

2. Description of the prior art

It is more particularly directed to transmission systems such as these which comprise, on the one hand, an annular member, hereinafter referred to for convenience as the input member, which is adapted to be keyed at least circumferentially to a first of the shafts concerned, in practice a driving shaft, and which features a generally cylindrical axial wall and a generally transverse radial wall, and, on the other hand, within the internal volume of said cylindrical wall, a movement take-up device keyed axially and circumferentially to the input member and at least circumferentially to the second of the shafts concerned, in practice a driven shaft.

A transmission system of this kind may, for example, form part of a hydraulic coupling unit, in particular for automobile vehicles, in the form of a torque converter or a hydraulic coupling.

A hydraulic coupling unit of this kind generally comprises an impeller wheel and a cover which, itself comprising a generally cylindrical wall and a generally transverse wall, is fastened to the impeller wheel and forms with the outside wall of the latter a casing in which are disposed in particular, facing the impeller wheel, a turbine wheel and, within the internal volume of its cylindrical wall, between its transverse wall and said turbine wheel, a movement take-up device.

In the case where it is required to filter out at this point vibrations which may arise in the kinematic system into which the assembly is inserted, this movement take-up device is a torsional damper device which itself comprises two coaxial parts disposed to rotate relative to one another against elastic means disposed circumferentially between them and a first of which parts, hereinafter referred to for convenience as the input part, is keyed to the input member whereas the second of said parts, hereinafter referred to for convenience as the output part, is adapted to be keyed to the driven shaft concerned.

One of the problems to be overcome in implementing hydraulic coupling units of this type is to achieve under good conditions the axial and circumferential keying of the input part of the torsional damper device to the input member which the cover of the assembly constitutes.

In this instance, the problem results in particular from the fact that the component parts to be employed to achieve this are operative in an extremely congested environment, the amount of space available axially and radially being particularly limited.

Thought might be given, for example, to fastening to the transverse wall of the cover, as by welding or riveting, one of the component parts of the input part of the torsional damper device.

When riveting is employed, the necessary rivet may be drawn from the wall itself of the cover, to preserve the fluid-tightness of the assembly, although this is at the price of a certain degree of complexity.

When welding is used, an additional difficulty has to be overcome and is due to the fact that, although the wall of the cover concerned is of mild steel, for example, which can usually be welded, the same does not apply to the component parts of the input part of the torsional damper device, as these are usually of treated steel, for example, in the most usual situation, a steel which has been hardened by carbonitriding.

Moreover, in both cases the transverse wall in question of the cover consists of a portion of the cover which, in operation, is subjected to the highest mechanical stresses and which is therefore likely to be subjected to non-negligible deformation prejudicing the strength of the riveting and/or welding that may have been applied to it.

Given what has been said, it has also been proposed to link the input part of the torsional damper device to the cylindrical wall of the cover, where the stresses are lower, and to use for this purpose lugs fixed at one end to said input part and at the other end to said cylindrical wall of the cover.

In practice, in order to be weldable to the cylindrical wall of the cover, these lugs are made of mild steel and they are only fastened to the part concerned of the input part of the torsional damper device after this has had applied to it the carbonitriding treatment needed to harden it.

Apart from the fact that a process of this kind inevitably entails costly handling after such treatment, for the purposes of the fixing to be achieved, such fixing can only be done by riveting.

The use of rivets requires a non-negligible area for mounting them, which is inevitably detrimental from the point of view of the overall diameter of the assembly and which may prove unacceptable in certain applications, in particular those in which use is made, for the elastic means disposed circumferentially between the two parts of the torsional damper device, of coil springs which must be of significant circumferential extent to procure an equally extensive range of movement between said parts.

Also, in implementing hydraulic coupling units with integrated movement take-up devices of the type concerned, a further difficulty results from the fact that, independently of the previous problem of fixing the input part of the movement take-up device to the cover, it is desirable that the placing of the latter in said cover is effected by simple axial insertion into the cover, and that this be done autonomously, by means of a subassembly made up beforehand.

A general object of the present invention is an arrangement which, while enabling this requirement to be satisfied, also provides a satisfactory and simple means of overcoming the problems oulines hereinabove.

SUMMARY OF THE INVENTION

In a first aspect, the present invention consists in a transmission system comprising an annular input member adapted to be keyed at least circumferentially to a first shaft and having a generally cylindrical axial wall and a movement take-up device within said cylindrical wall having at least one protected mild steel lug by which it is keyed axially and circumferentially to said cylindrical wall and adapted to be at least circumferentially keyed to a second shaft and an input part to which one end of said lug is welded, the other end of said lug being fixed to said cylindrical wall.

In the present context the term "protected mild steel" means a mild steel having a surface coating adapted to protect it against any treatment to which the lug or lugs in question may subsequently be subjected.

In accordance with one preferred embodiment of the invention, the lugs are copper-plated.

Be this as it may, being protected the lugs may be subjected to any form of hardening treatment, carbonitriding, for example, without this resulting in any kind of modification to their inherent characteristics, in particular any change in their suitability for welding.

They may then be attached by welding to the part to be so equipped of the input part concerned, before the latter is subjected to carbonitriding, whilst remaining suitable for subsequent welding to the cylindrical wall of the associated input member.

Thus in accordance with the invention, to implement the movement take-up device to be employed the lug or lugs is or are first attached by welding to the part concerned of the device before any application of hardening treatment to said part and any such hardening treatment is only subsequently applied to the thus constituted combination of a part of this kind and said lugs.

Overall, the method of manufacturing the assembly is thereby simplified.

Also, the space to be provided for carrying out the welding needed to fix these lugs to the input part of the movement take-up device may advantageously be extremely limited in the diametral direction, which facilitates the fitting of these lugs, even in a congested environment.

This is all the more true in that, in accordance with a further feature of the invention, the portion of said input part to which the lug or lugs is or are thus attached by welding may advantageously itself be formed by a simple axial extension, also of extremely limited diametral size, of one of the component parts of said input part.

The characteristics and advantages of the invention will emerge from the following description given by way of example with reference to the appended drawings.

BRIEF DESCRIPTION OF THE DRAWINGS

FIG. 1 is a half-view in axial cross-section of a transmission system in accordance with the invention and of the hydraulic coupling unit of which it forms part.

FIG. 2 is a partial view in elevation and cross-section of this transmission system, as seen from the inside in the direction of the arrow II in FIG. 1, developed in the flat.

FIG. 3 is a partial lateral view of it in the direction of the arrow III in FIG. 2.

FIG. 4 is a partial view in axial cross-section which, repeating that of FIG. 1 in part, also refers to an alternative embodiment.

DESCRIPTION OF THE PREFERRED EMBODIMENTS

Figure 5:
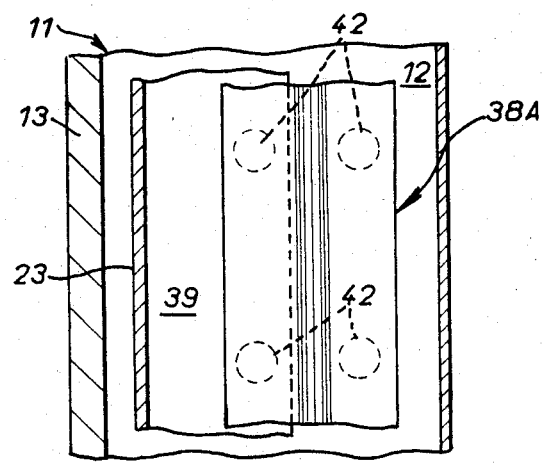
FIG. 5 is a partial view similar to FIG. 2 showing the axial extension as forming a continuous ferrule.

The figures show by way of example the application of the invention to a hydraulic coupling unit with integrated movement take-up device.

As a hydraulic coupling unit of this kind does not of itself constitute part of the present invention, it will not be described in complete detail here.

In this instance, it consists of a torque converter.

A hydraulic coupling unit of this kind comprises, overall, an impeller wheel 10 and a cover 11 which, comprising a generally cylindrical wall 12 and a generally transverse wall 13, is fastened to the impeller wheel 10, more precisely to the otside wall 14 of the latter, being for example welded to said outside wall 14 by the edge of its cylindrical wall 12.

The term "generally transverse wall" here signifies, in the usual manner, a wall which, taken overall, extends substantially perpendicularly to the axis X of the assembly, it being nevertheless understood that, as shown, it may have a more or less convoluted configuration.

Be this as it may, the annular part which in this way constitutes the cover 11 forms an input member of the assembly, this annular member being adapted to be keyed at least circumferentially to a first shaft.

In practice this is a driving shaft, more precisely the crankshaft 15 of the motor of the vehicle concerned.

An elastically deformable flange 16 couples this crankshaft 15 to the transverse wall 13 of the cover 11, being fixed to said crankshaft 15 by screws 17 and to said transverse wall 13 by bolts 18 welded to the latter.

The cover 11 forms with the outside wall 14 of the impeller wheel 10 a casing in which are disposed, in particular, on the one hand, facing the impeller wheel 10, a turbine wheel 20 with, in this specific instance, a reactor wheel 21 between this impeller wheel 10 and this turbine wheel 20, at the root of the latter, and, on the other hand, within the internal volume of the cylindrical wall 12 of the cover 11, between the transverse wall 13 of the latter and the turbine wheel 20, a movement take-up device 22.

In the embodiment shown this is a torsional damper device, for example.

As this torsional damper device 22 does not of itself form part of the present invention, it will not be described in complete detail here.

It will suffice to indicate that, in the manner known per se, it generally comprises two coaxial parts A and B which are disposed to rotate relative to one another against elastic means disposed circumferentially between them and a first of which, the part A, hereinafter referred to for convenience as the input part, is keyed axially and circumferentially to the input member constituted by the cover 11, whereas the second, the part B, hereinafter referred to for convenience as the output part, is adapted to be keyed at least circumferentially to a second shaft.

In practice this is a driven shaft, the input shaft of a gearbox (not shown), for example.

In the embodiment shown, the input part A comprises two annular transverse flanges 23 forming guide rings for the associated elastic means disposed one on each side of an annular flange 25 forming a hub flange which is part of the output part B and is fastened at its inside periphery, as by rivets 26, for example, to the flange 27 of a hub 28 adapted to be constrained to rotate with the driven shaft concerned.

The annular flanges 23 are constrained to rotate together, being to this end linked together by rivets 29 which pass through openings 30 provided for this purpose in the annular flange 25 that lies between them.

Each is separated from this flange by a respective friction ring 32.

In the embodiment shown, the elastic means disposed circumferentially between the parts A and B thus constituted themselves consist of coil springs 34 which are circumferentially distributed and each of which is individually disposed and accommodated partly in openings 35 provided for this purpose in the annular flange 25 that the output part B comprises and partly in openings 36 also provided for this purpose, and in corresponding relationship with the openings 35, in the annular flanges 23 of the input part A.

In the usual way, the annular flanges 23 in particular of the input part A are of steel which has been subjected to a hardening treatment, in practice a treatment by carbonitriding, whereas the cover 11 is of mild steel.

For the axial and circumferential keying of this input part A of the torsional damper device 22 to the cylindrical wall 12 of the cover 11 there is used at least one lug 38, in practice a plurality of such lugs 38 which are circumferentially distributed and each of which is fixed at one end to said input part A and at the other end of said cylindrical wall 12 of the cover 11.

In accordance with the invention these lugs 38 are of protected mild steel, copper-plated, for example, and they are fixed by welding to the input part A of the torsional damper device 32 and to the cylindrical wall 12 of the cover 11.

As shown here, at least one of the lugs 38, and in practice each of them, is preferably attached by welding to an axial extension 39 of one of the component parts of the input part A concerned.

In the embodiment shown this is one of the annular flanges 23 of this part A, more specifically in the embodiment particularly shown in FIGS. 1 through 3, that axially nearer the transverse wall 13 of the cover 11.

In practice the axial extension 39 originates from the outside periphery of this annular flange 23 and extends in the direction opposite to said transverse wall 13 of the cover 11, beyond the outside periphery of the annular flange 25 of the associated output part B and that of the other annular flange 23 of the input part A.

For example, and as shown here, an axial extension of this kind forms a circumferentially continuous ferrule, common to all the lugs 38 employed.

In the embodiment shown, these lugs 38 are attached to the radially innermost surface of an axial extension 39 of this kind and they feature a transversely offset portion 40 for fixing them to the cylindrical wall 12 of the cover 11.

In practice they are simple plates of generally rectangular contour.

In the embodiment shown each of them is spot welded to the axial extension 39 concerned and to the cylindrical wall 12 of the cover 11.

As schematically represented, two spot welds 42, for example, may be sufficient for this purpose, both for said axial extension 39 and for said cylindrical wall 12.

Be this as it may, and as will be noted, in accordance with one characteristic of the invention the lugs 38 are fixed by welding at both ends.

In practice the lugs 38 are first attached by welding to the annular flange 23 concerned of the input part A of the torsional damper device 22, before the hardening treatment to which the latter must be subjected, this treatment being applied only afterwards to the thus constituted combination of this annular flange 23 and the lugs 38 previously welded to it.

As will be noted, by virtue of the use of an axial extension 39 for the annular flange 23 concerned, the corresponding end of the lugs 38 is advantageously situated beyond the other of the annular flanges 23 of the input part A of the torsional damper device 22 relative to the foreoging annular flange 23.

The fitting of the lugs 38 is thereby facilitated.

As will also be noted, the lugs 38 advantageously procure radial centering of the torsional damper device 22 within the cover 11.

Also, and as will be readily understood, the torsional damper device 22 may advantageously constitute a previously assembled subassembly which, when the complete assembly is put together, is individually placed as an autonomous unit into the cover 11, by simple axial insertion into the latter.

It is then sufficient to weld the lugs 38 which it carries to the cylindrical wall 12 of the cover 11.

In the embodiment shown in FIG. 4 the lugs 38 are welded to an axial extension 39' of the annular flange 23 of the torsional damper device 22 that is farthest from the transverse wall 13 of the cover 11, said extension 39' extending, like the foregong axial extension 39, in the direction opposite to said transverse wall 13.

Figure 6:
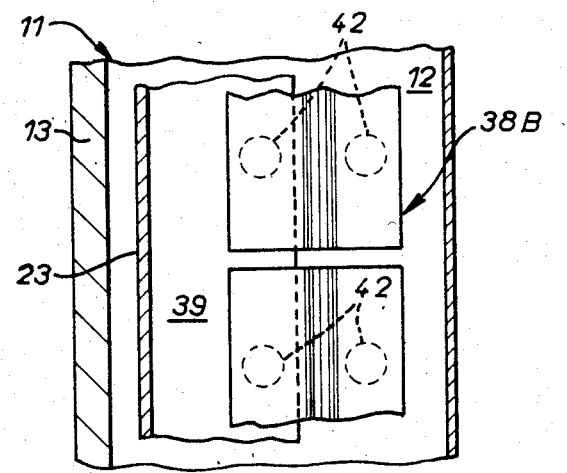
FIG. 6 is another partial view similar to FIG. 2 showing the lug as being a split ferrule.

As is best shown in FIG. 5, the lugs may form a circumferentially continuous ferrule, the continuous lug being identified by the numeral 38A. On the other hand, as is shown in FIG. 6, the lugs may form a split ferrule with such a lug being indentified by the numeral 38B.

It is to be understood that the present invention is not limited to the embodiments described and shown, but encompasses all variants as to their execution and/or combinations of their various component parts.

Furthermore, applications of the invention are not necessarily limited to hydraulic coupling units as specifically described and shown, but extend generally to all transmission systems with integrated movement take-up device.

I claim:

1. Transmission system comprising an annular input member adapted to be keyed at least circumferentially to a first shaft and having a generally cylindrical axial wall and a movement take-up device within said cylindrical wall having at least one mild steel lug protected against subsequent hardening treatment, said lug keying siad movement take-up device axially and circumferentially to said cylindrical wall, said movement take-up device adapted to be at least circumferentially keyed to a second shaft, said movement take-up device having an input part to which one end of said lug is welded, the other end of said lug being fixed to said cylindrical wall.

2. Transmission system according to claim 1, wherein said movement take-up device input part has a component with an axial extension to which said at least one lug is welded.

3. Transmission system according to claim 2, wherein said input part comprises at least one annular transverse flange and said axial extension is an axial extension of said flange at the outside periphery thereof.

4. Transmission system according to claim 3, wherein said input part has a transverse wall and comprises two annular transverse flanges and said axial extension is an axial extension of the flange nearer said transverse wall in the axial direction and extends in the opposite direction to said transverse wall.

5. Transmission system according to claim 3, wherein said input part has a transverse wall and comprises two annular transverse flanges and said axial extension is an axial extension of the flange farther from said transverse wall in the axial direction and extends in the opposite direction to said transverse wall.

6. Transmission system according to claim 4, wherein said axial extension forms a circumferentially continuous ferrule.

7. Transmission system according to claim 5, wherein said axial extension forms a circumferentially continuous ferrule.

8. Transmission system according to claim 3, wherein said at least one lug is welded to the radially innermost surface of said axial extension and has a transversely offset portion for attaching it to said cylindrical wall.

9. Transmission system according to claim 1, wherein said at least one lug is copper-plated.

10. Transmission system according to claim 1, wherein said at least one lug is welded at both ends.

11. Transmission system according to claim 1, wherein said at least one lug is a generally rectangular plate.

12. Transmission system according to claim 4, wherein one end of said at least one lug is disposed beyond the other annular flange of said input part relative to that to said axial extension of which it is welded.

13. Transmission system according to claim 1, wherein said at least one lug forms a single circumferentially continuous ferrule.

14. Transmission system according to claim 1, wherein said at least one lug forms a single split ferrule.

15. Movement take-up device for use in a transmission system of the type having an annular input member adapted to be keyed at least circumferentially to a first shaft and having a generally axial cylindrical wall the movement take-up device being adapted to be circumferentially keyed to a second shaft, and comprising an input part and at least one lug for keying axially and circumferentially the movement take-up device to the cylindrical wall being of mild steel and protected against subsequent hardening treatment, said at least one lug being adapted to be fixed to the cylindrical wall and welded to said movement take-up device.

16. Hydraulic transmission unit comprising an impeller wheel having an outside wall, a cover having a generally cylindrical wall and a generally transverse wall and fixed to said impeller wheel to form with said outside wall thereof a casing, a turbine wheel within said casing facing said impeller wheel, and a movement take-up device within said generally cylindrical wall between said generally transverse wall and said turbine wheel, wherein said cover and said movement take-up device together constitute a transmission system comprising an annular input member adapted to be keyed at least circumferentially to a first shaft and having a generally cylindrical axial wall and a movement take-up device within said cylindrical wall having at least one mild steel lug protected against subsequent hardening treatment, said lug keying said movement take-up device axially and circumferentially to said cylindrical wall and adapted to be at least circumferentially keyed to a second shaft, said movement take-up device having an input part to which one end of said lug is welded, the other end of said lug being fixed to said cylindrical wall.

17. Method of assembling a movement take-up device for use in a transmission system of the type having an annular input member adapted to be keyed at least circumferentially to a first shaft and having a generally axial cylindrical wall the movement take-up device being comprising an input part and at least one lug for keying axially and circumferentially the movement take-up device to the cylindrical wall being of mild steel and protected against subsequent hardening treatment, said at least one lug being adapted to be fixed to the cylindrical wall and welded to said movement take-up device, the method comprising the steps of: first welding the at least one lug to the input part of the movement take-up device and then carrying out a hardening treatment of the movement take-up input part prior to fixing the at least one lug to the cylindrical wall of the input member.

* * * * *